United States Patent
Terada et al.

(10) Patent No.: US 8,865,334 B2
(45) Date of Patent: Oct. 21, 2014

(54) THERMALLY CONDUCTIVE MEMBER, AND BATTERY DEVICE USING THE SAME

(71) Applicants: Yoshio Terada, Ibaraki (JP); Akira Shouji, Ibaraki (JP); Kouki Tomioka, Ibaraki (JP); Kenji Furuta, Ibaraki (JP); Midori Tojo, Ibaraki (JP); Kazunori Hayashi, Sakai (JP); Shoujirou Moriki, Sakai (JP)

(72) Inventors: Yoshio Terada, Ibaraki (JP); Akira Shouji, Ibaraki (JP); Kouki Tomioka, Ibaraki (JP); Kenji Furuta, Ibaraki (JP); Midori Tojo, Ibaraki (JP); Kazunori Hayashi, Sakai (JP); Shoujirou Moriki, Sakai (JP)

(73) Assignee: Nitto Denko Corporation, Ibaraki-shi (JP)

( * ) Notice: Subject to any disclaimer, the term of this patent is extended or adjusted under 35 U.S.C. 154(b) by 0 days.

(21) Appl. No.: 13/944,591

(22) Filed: Jul. 17, 2013

(65) Prior Publication Data

US 2013/0302659 A1    Nov. 14, 2013

Related U.S. Application Data

(62) Division of application No. 13/502,594, filed as application No. PCT/JP2010/066885 on Sep. 29, 2010, now Pat. No. 8,597,812.

(30) Foreign Application Priority Data

Oct. 19, 2009  (JP) .................................. 2009-240912
Apr. 27, 2010  (JP) .................................. 2010-102147

(51) Int. Cl.
*H01M 10/50*   (2006.01)
*H01M 10/6555* (2014.01)
*H01M 10/653*  (2014.01)
*H01M 10/04*   (2006.01)
*H01M 10/647*  (2014.01)

(52) U.S. Cl.
CPC ........ *H01M 10/5055* (2013.01); *H01M 10/504* (2013.01); *H01M 10/0413* (2013.01); *Y02E 60/12* (2013.01); *H01M 10/5032* (2013.01)
USPC .......................................... 429/120; 165/185

(58) Field of Classification Search
USPC .......................................... 429/120; 165/185
See application file for complete search history.

(56) References Cited

U.S. PATENT DOCUMENTS 5,756,227 A     5/1998 Suzuki et al.
2006/0120011 A1* 6/2006 Handa et al. ................... 361/234

(Continued)

FOREIGN PATENT DOCUMENTS

CN    1295539 A    5/2001
CN    1753171 A    3/2006

(Continued)

OTHER PUBLICATIONS

International Search Report for PCT/JP2010/066885, dated Dec. 7, 2010.

(Continued)

*Primary Examiner* — Mark F Huff
*Assistant Examiner* — Monique Wills
(74) *Attorney, Agent, or Firm* — Westerman, Hattori, Daniels & Adrian, LLP (57) ABSTRACT

An object is to, in a battery pack device in which battery cells are lined up, provide a thermally conductive member that can reduce the risk of heat being conducted to an adjacent battery cell in order to make the cooling property of each battery cell uniform, and a battery pack device using this thermally conductive member. Provided is a thermally conductive member arranged between battery cells when assembling the battery cells into a battery pack, wherein the thermally conductive member includes thermally conductive layers each having a thermal conductivity of 0.5 W/mK or more provided respectively on both sides of a backing layer having a thermal conductivity of less than 0.5 W/mK. Especially, it is preferred that a resin member forming the backing layer has a flexural modulus of 1 GPa or more.

5 Claims, 3 Drawing Sheets

(56) References Cited

U.S. PATENT DOCUMENTS

| | | |
|---|---|---|
| 2008/0254348 A1 | 10/2008 | Hatta et al. |
| 2008/0254648 A1 | 10/2008 | Lafarre |
| 2009/0061299 A1 | 3/2009 | Uchida et al. |
| 2009/0123815 A1 | 5/2009 | Alkemade et al. |
| 2010/0233572 A1 | 9/2010 | Yajima et al. |
| 2011/0064983 A1 | 3/2011 | Yokoyama et al. |

FOREIGN PATENT DOCUMENTS

| | | |
|---|---|---|
| CN | 1774475 A | 5/2006 |
| CN | 101035876 A | 9/2007 |
| CN | 101378141 A | 3/2009 |
| EP | 2031672 A1 | 3/2009 |
| JP | 01-186768 A | 7/1989 |
| JP | 06-97651 A | 4/1994 |
| JP | 07-045310 A | 2/1995 |
| JP | 2003-313431 A | 11/2003 |
| JP | 2005-317455 A | 11/2005 |
| JP | 2006-048996 A | 2/2006 |
| JP | 2006-196230 A | 7/2006 |
| JP | 2007-012486 A | 1/2007 |
| JP | 2008-047371 A | 2/2008 |
| JP | 2008-266387 A | 11/2008 |
| JP | 2009-054403 A | 3/2009 |
| JP | 2009-87543 A | 4/2009 |
| JP | 2009-134901 A | 6/2009 |
| JP | 2009-134936 A | 6/2009 |

OTHER PUBLICATIONS

International Preliminary Report on Patentability (Form PCT/IB/373) 1 page of International Application No. PCT/JP2010/066885 mailed Dec. 7, 2010, with form PCT/ISA/237 (11 pages) (English translation).

Extended European Search Report dated Mar. 19, 2014, issued in corresponding European Patent Application No. 10824765.1 (3 pages).

Japanese Office Action dated Mar. 7, 2014, issued in corresponding Japanese Patent Application No. 2010-102147 (5 pages).

Chinese Office Action dated Aug. 5, 2014, issued in corresponding application No. 201080047660.9.

* cited by examiner

THERMALLY CONDUCTIVE MEMBER, AND BATTERY DEVICE USING THE SAME

CROSS-REFERENCE TO RELATED APPLICATIONS

This application is a divisional of U.S. application Ser. No. 13/502,594, filed on May 21, 2012 which is based upon and claims the benefit of priority from International Application PCT/JP2010/066885 filed on Sep. 29, 2010, Japanese Patent Application No. 2010-102147, filed on Apr. 27, 2010 and the prior Japanese Patent Application No. 2009-240912, filed on Oct. 9, 2009, the entire contents of which are incorporated herein by reference.

TECHNICAL FIELD

The present invention relates to a thermally conductive member and a battery pack device using this thermally conductive member. More specifically, the present invention relates to a thermally conductive member that is arranged between battery cells when assembling the battery cells into a battery pack, and a battery pack device using this thermally conductive member.

BACKGROUND ART

Recently, interest in measures against global warming, energy saving, environmental pollution and the like has been increasing. Further, interest is shifting from conventional automobiles, which burn fossil fuels and discharge carbon dioxide, to hybrid automobiles that combine a gasoline engine and an electric motor and electric automobiles that run on only an electric motor. Thus, to make hybrid automobiles and electric automobiles run efficiently, there is a need for development of a high-voltage, high energy-capacity, and high-energy density battery.

The nickel-hydrogen secondary batteries, lithium-ion batteries and the like that are used in such electric automobiles need to have a high energy density, and have a mounting space that is as small as possible. Consequently, for a high-voltage high-capacity battery, a plurality of cells is connected in series or in parallel and a battery pack device is used that connects several to several dozen or several hundred cells together.

A battery cell configuring such a battery pack can generate heat from internal reactions. Since the performance and life of a battery pack greatly depend on the temperature environment, and deterioration can be pronounced at high temperatures, cooling methods have been proposed (cf., Patent Documents 1 to 3).

Concerning the methods described in Patent Documents 1 to 3, problems such as cooling efficiency and increased size of the apparatus have been pointed out. As a method to replace these methods, a battery pack device in which thermally conductive members formed in a sheet shape (plate shape) from a soft material that has thermal conduction properties and electrical insulation properties are arranged between battery cells has been disclosed (Patent Document 4).

CITATION LIST

Patent Documents

Patent Document 1: Japanese Patent Laid-Open No. 07-045310

Patent Document 2: Japanese Patent Laid-Open No. 2007-012486

Patent Document 3: Japanese Patent Laid-Open No. 2006-048996

Patent Document 4: Japanese Patent Laid-Open No. 2009-054403

SUMMARY OF INVENTION

Technical Problem

However, in the battery pack device described in Patent Document 4, there is no particular stipulation about the thermally conductive member. There is merely a description that silicone rubber, rubber mixed with a high thermal conductivity material, or a thermoplastic elastomer is used. Consequently, although indirectly cooling the battery cells by dissipating heat into a dissipation space with a thermally conductive member is an effective method, the thermally conductive member is a single layer, so that the problem is that heat in the battery cells is conducted to adjacent battery cells via the thermally conductive member without the heat being dissipated into the dissipation space.

In view of the above-described circumstances, the present invention has been made and it is an object of the present invention to, in a battery pack device in which battery cells are arranged, provide a thermally conductive member that can make the cooling property of each battery cell uniform while suppressing the heat conducted to adjacent battery cells, and a battery pack device using this thermally conductive member.

Solution to Problem

The present inventors discovered that the above problems can be resolved by, for a thermally conductive member that is arranged between battery cells when assembling the battery cells into a battery pack, employing a structure that is made to have heat insulating properties between layers made to have thermal conduction properties, thereby completing the present invention.

Specifically, according to the present invention, there is provided a thermally conductive member arranged between battery cells when assembling the battery cells into a battery pack, wherein the thermally conductive member includes at least a three-layer laminated structure composed of a backing layer having a thermal conductivity of less than 0.5 W/mK and thermally conductive layers each having a thermal conductivity of 0.5 W/mK or more provided respectively on both sides of the backing layer.

In the thermally conductive member according to the present invention, it is preferred that the backing layer has a thickness of 0.1 to 10 mm, and that a ratio of a thickness of each of the thermally conductive layers and a thickness of the backing layer is 1/1 to 1/10,000. Further, it is preferred that the backing layer is formed from a resin member having a flexural modulus of 1 GPa or more.

Further, it is preferred that each of the thermally conductive layers of the thermally conductive member according to the present invention is provided on a topmost surface and that a surface of each of the thermally conductive layers has an adhesion or peel strength of 0.2 N/20 mm or more.

In addition, the battery pack device according to the present invention includes a plurality of alternately arranged battery cells and the above-described thermally conductive members.

In the battery pack device according to the present invention, it is preferred that each of the above-described thermally conductive members is arranged so as to extend further than the battery cells arranged on both sides of each of the thermally conductive members. It is also preferred that the battery pack device further includes a mechanism for air cooling this extending portion.

Advantageous Effects of Invention

Since the thermally conductive member according to the present invention has the above-described configuration, a layer having heat insulating properties is provided between layers having thermal conduction properties, and if the thermally conductive member according to the present invention is used in a battery pack device, heat in the battery cells is efficiently dissipated into a heat dissipation space due to the suppression of heat conducted from the thermally conductive members to adjacent battery cells.

DESCRIPTION OF EMBODIMENTS

The thermally conductive member according to the present embodiment has a sheet shape having a three-layer laminated structure, in which a thermally conductive layer (hereinafter, also referred to as "thermally conductive organic resin layer") formed from a resin composition is laminated on each of both sides of a backing layer formed using a resin member, wherein a thermally conductive organic resin layer having a thermal conductivity of 0.5 W/mK or more is provided on each of both sides of a sheet-like resin member having a thermal conductivity of less than 0.5 W/mK.

Specifically, the thermally conductive member according to the present embodiment has a three-layer laminated structure as its basic structure composed of a thermally conductive organic resin layer, a resin member and a thermally conductive organic resin layer. The backing layer serving as the center of the thermally conductive member is formed from the above-described sheet-like resin member, and the thermally conductive organic resin layers form the surface layers of the thermally conductive member.

Each layer will now be described in more detail below.
(Thermally Conductive Organic Resin Layer)

In the present invention, the thermally conductive organic resin layer needs to have a thermal conductivity of 0.5 W/mK or more. If a thermally conductive organic resin layer having a thermal conductivity of 0.5 W/mK or more is used, when the thermally conductive member is formed, the thermal conductivity of the surface layers can be made 0.5 W/mK or more.

Further, by using the thermally conductive member in a battery pack device, the heat generated from the battery cells can be efficiently conducted away to cool the device. In the present invention, it is preferred that the thermally conductive organic resin layer has a thermal conductivity of 1.0 W/mK or more, more preferably 2.0 W/mK or more, and especially preferably 3.0 W/mK or more (and usually 1,000 W/mK or less).

Further, in the present invention, it is preferred that the thermally conductive organic resin layer has an adhesion or peel strength to an SUS plate (180° peel, rate of pulling: 300 mm/min) of 0.2 N/20 mm or more, more preferably 0.3 to 20 N/20 mm, and even more preferably 0.5 to 15 N/20 mm. If the thermally conductive organic resin layer has an adhesion or peel strength of 0.2 N/20 mm or more, the thermally conductive organic resin layer sufficiently adheres to the battery cell, the fit with the contact interface is good, and contact thermal resistance is suppressed, so that the thermal conduction properties improve. In addition, the thermally conductive member can be temporarily adhered by sticking it onto a battery cell. On the other hand, if the adhesion or peel strength is more than 20 N/20 mm, re-sticking when a lamination mistake (misalignment) has occurred (reworking properties) and separating the thermally conductive member from the battery cell when discarding the used battery pack (repair properties) can become more difficult.

Although the material used for the thermally conductive organic resin layer in the present invention is not especially limited, a material that can achieve both thermal conduction properties and adhesion properties is preferred. For example, a thermally conductive organic resin composition that contains a thermally conductive filler in a polymer component, such as a thermoplastic elastomer, a silicone rubber, and an acrylic polymer, can be preferably used. It is especially preferred to use an acrylic polymer for the polymer component, because such a polymer component has an adhesion or peel strength and can exhibit a shock-absorbing property.

The acrylic polymer component is not especially limited. For example, a commonly-used acrylic polymer may be used.

In the present invention, the acrylic polymer used for the thermally conductive organic resin composition contains a (meth)acrylic monomer represented by the following general formula (1) as a monomer unit.

$$CH_2=C(R^1)COOR^2 \qquad (1)$$

In the general formula (1), $R^1$ represents a hydrogen or a methyl group.

Further, in the general formula (1), $R^2$ represents an alkyl group having 2 to 14 carbon atoms, preferably 3 to 12 carbon atoms, and more preferably 4 to 9 carbon atoms. In addition, although the alkyl group of $R^2$ may be either a straight chain or a branched chain, it is preferred to use a branched chain because the glass transition temperature of the obtained polymer can be decreased.

Specific examples of the (meth)acrylic monomer represented by the general formula (1) include ethyl (meth)acrylate, n-butyl (meth)acrylate, s-butyl (meth)acrylate, t-butyl (meth)acrylate, isobutyl (meth)acrylate, n-pentyl (meth)acrylate, isopentyl (meth)acrylate, hexyl (meth)acrylate, heptyl (meth)acrylate, isoamyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, n-dodecyl (meth)acrylate, isomyristyl (meth)acrylate, n-tridecyl (meth) acrylate, n-tetradecyl (meth)acrylate, stearyl (meth)acrylate, isostearyl (meth)acrylate and the like.

In the present invention, the (meth)acrylic monomer represented by the general formula (1) may be used singly or in mixtures of two or more. Based on all of the monomers in the acrylic polymer, the total content of the (meth)acrylic monomer is 50 to 98% by weight, preferably 60 to 98% by weight, and more preferably 70 to 90% by weight. If the (meth)acrylic monomer is less than 50% by weight, the adhesion properties become poor, which is not preferable.

It is preferred that the above-described acrylic polymer contains as a monomer unit 0.1 to 20% by weight, more preferably 0.2 to 10% by weight, and even more preferably 0.2 to 7% by weight, of a polar group-containing monomer, such as a hydroxyl group-containing monomer and a carboxyl group-containing monomer. If the content of this polar group-containing monomer is within the above range, a high cohesive force between the obtained polymer chains is exhibited. On the other hand, if the content of the polar group-containing monomer is more than 20% by weight, the adhesion properties may deteriorate.

The above-described "hydroxyl group-containing monomer" means a polymerizable monomer having one or more hydroxyl groups in the monomer structure. Examples of the hydroxyl group-containing monomer include 2-hydroxyethyl (meth)acrylate, 3-hydroxypropyl (meth)acrylate, 2-hydroxybutyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, (4-hydroxymethylcyclohexyl) methylacrylate, N-methylol (meth)acrylamide, N-hydroxy (meth)acrylamide, vinyl alcohol, allyl alcohol, 2-hydroxyethyl vinyl ether, 4-hydroxybutyl vinyl ether, diethylene glycol monovinyl ether and the like. Of these, 4-hydroxybutyl (meth)acrylate, 6-hydroxyhexyl (meth)acrylate and the like are preferred as the hydroxyl group-containing monomer.

The above-described "carboxyl group-containing monomer" means a polymerizable monomer having one or more carboxyl groups in the monomer structure. Examples of the carboxyl group-containing monomer include acrylic acid, methacrylic acid, carboxyethyl (meth)acrylate, carboxypentyl (meth)acrylate, itaconic acid, maleic acid, fumaric acid, crotonic acid and the like. Of these, especially acrylic acid and methacrylic acid can be preferably used.

In addition to the above-described monomers, a polymerizable monomer to adjust the glass transition temperature and the release properties of the acrylic polymer can be used in the acrylic polymer of the present invention within a range which does not substantially harm the advantageous effects of the present invention.

Examples of other polymerizable monomers that can be appropriately used in the acrylic polymer of the present invention include a component that improves cohesive force/heat resistance, such as a sulfonic acid group-containing monomer, a phosphoric acid group-containing monomer, a cyano group-containing monomer, a vinyl ester monomer, and an aromatic vinyl monomer, and a component having a functional group that improves adhesive strength or that acts as a crosslinking starting point, such as an amide group-containing monomer, an amino group-containing monomer, an imido group-containing monomer, an epoxy group-containing monomer, and a vinyl ether monomer. In addition, in the above-described general formula (1), a monomer in which $R^2$ is an alkyl group having 1 carbon atom or 15 or more carbon atoms may also be appropriately used. These monomer compounds may be used singly or in mixtures of two or more.

Examples of the sulfonic acid group-containing monomer include styrene sulfonic acid, allylsulfonic acid, 2-(meth)acrylamide-2-methylpropane sulfonic acid, (meth)acrylamidepropane sulfonic acid, sulfopropyl (meth)acrylate, (meth)acryloyloxynaphthalene sulfonic acid and the like.

Examples of the phosphate group-containing monomer include 2-hydroxyethylacryloyl phosphate.

Examples of the cyano group-containing monomer include acrylonitrile and methacrylonitrile.

Examples of the vinyl ester monomer include vinyl acetate, vinyl propionate, vinyl laurate, vinyl pyrrolidone and the like.

Examples of the aromatic vinyl monomer include styrene, chlorostyrene, chloromethyl styrene, α-methylstyrene and the like.

Examples of the amide group-containing monomer include (meth)acrylamide, N,N-dimethyl (meth)acrylamide, N,N-diethyl (meth)acrylamide, N-isopropyl (meth)acrylamide, N-methylol (meth)acrylamide, N-methoxymethyl (meth)acrylamide, N-butoxymethyl (meth)acrylamide, dimethylaminoethyl (meth)acrylate, t-butylaminoethyl (meth)acrylate, diacetone (meth)acrylamide, N-vinylacetamide, N,N'-methylene-bis(meth)acrylamide, N,N-dimethylaminopropyl (meth)acrylamide, N-vinylcaprolactam, N-vinyl-2-pyrrolidone and the like.

Examples of the amino group-containing monomer include aminoethyl (meth)acrylate, N,N-dimethylaminoethyl (meth)acrylate, N,N-dimethylaminopropyl (meth)acrylate, N-(meth)acryloyl morpholine and the like.

Examples of the imido group-containing monomer include N-cyclohexylmaleimide, N-phenylmaleimide, N-methylmaleimide, N-ethylmaleimide, N-propylmaleimide, N-isopropylmaleimide, N-butylmaleimide, itaconimide and the like.

Examples of the epoxy group-containing monomer include glycidyl (meth)acrylate, allyl glycidyl ether and the like.

Examples of the vinyl ether monomer include methyl vinyl ether, ethyl vinyl ether, isobutyl vinyl ether and the like.

Examples of the (meth)acrylic monomer that has an alkyl group having 1 carbon atom or 15 or more carbon atoms include methyl (meth)acrylate, pentadecyl (meth)acrylate, hexadecyl (meth)acrylate, octadecyl (meth)acrylate and the like.

Further, to increase properties such as the cohesive force of the obtained polymer molecules, the monomer can include other copolymerizable monomers as necessary. Examples of such a copolymerizable monomer include a vinyl compound, such as vinyl acetate, styrene, and vinyl toluene; a (meth)acrylic acid ester of a cyclic alcohol, such as cyclopentyl di(meth)acrylate and isobornyl (meth)acrylate; a (meth)acrylic acid ester of a polyhydric alcohol, such as neopentyl glycol di(meth)acrylate, hexanediol di(meth)acrylate, propyleneglycol di(meth)acrylate, trimethylolpropane tri(meth)acrylate, tetramethylolmethane tri(meth)acrylate, and dipentaerythritol hexa(meth)acrylate, and the like.

This other polymerizable monomer may be used singly or in mixtures of two or more. Based on all of the monomers in the acrylic polymer, the total content of this other polymerizable monomer is preferably 0 to 50% by weight, more preferably 0 to 35% by weight, and even more preferably 0 to 25% by weight.

Further, it is preferred that the above-described acrylic polymer has a weight average molecular weight of 600,000 or more, more preferably 700,000 to 3,000,000, and even more preferably 800,000 to 2,500,000. If the weight average molecular weight is smaller than 600,000, durability can be poor. On the other hand, from the perspective of the workability when producing the thermally conductive member using this acrylic polymer, it is preferred that the weight average molecular weight is not more than 3,000,000. The weight average molecular weight is a value calculated by measuring by GPC (gel permeation chromatography) based on polystyrene.

From the perspective of easily obtaining a balance with adhesion properties (pressure-sensitive adhesion properties), it is preferred that the acrylic polymer has a glass transition temperature (Tg) of −5° C. or lower, and more preferably of −10° C. or lower. If the glass transition temperature is higher than −5° C., the polymer may not flow easily, wetting onto the adherend may not be sufficient, and the adhesive strength may deteriorate. Further, the glass transition temperature (Tg) of the acrylic polymer can be adjusted to within the above-described range by appropriately changing the used monomer components and composition ratio.

The method for producing such an acrylic polymer can be appropriately selected from among known production methods, such as solution polymerization, mass polymerization, emulsion polymerization, and various radical polymerization methods. Although the obtained acrylic polymer may be a homopolymer or a copolymer, if it is a copolymer, the acrylic polymer may be any of a random copolymer, a block copolymer, a graft copolymer and the like.

In solution polymerization, ethyl acetate, toluene or the like is used as a polymerization solvent. As a specific example of solution polymerization, a reaction is carried out, usually, at about 50 to 70° C. for about 8 to 30 hours by adding 0.01 to 0.2 parts by weight of azobisisobutyronitrile as a polymerization initiator to a total of 100 parts by weight of monomer under a flow of an inert gas, such as nitrogen.

A polymerization initiator, chain transfer agent, emulsifier and the like used in radical polymerization are not especially limited, and can be selected as appropriate.

Examples of the polymerization initiator used in the present invention include, but are not limited to, azo initiators, such as 2,2'-azobisisobutyronitrile, 2,2'-azobis(2-amidinopropane)dihydrochloride, 2,2'-azobis[2-(5-methyl-2-imidazoline-2-yl)propane]dihydrochloride, 2,2'-azobis(2-methylpropionamidine)disulfate, 2,2'-azobis(N,N'-dimethyleneisobutylamidine), and 2,2'-azobis[N-(2-carboxyethyl)-2-methylpropionamidine]hydrate (VA-057, manufactured by Wako Pure Chemical Industries, Ltd.), persulfates such as potassium persulfate and ammonium persulfate, peroxide initiators, such as di(2-ethylhexyl)peroxydicarbonate, di(4-t-butylcyclohexyl)peroxydicarbonate, di-s-butylperoxydicarbonate, t-butylperoxyneodecanoate, t-hexylperoxypivalate, t-butylperoxypivalate, dilauroyl peroxide, di-n-octanoyl peroxide, 1,1,3,3-tetramethylbutylperoxy-2-ethylhexanoate, di(4-methylbenzoyl)peroxide, dibenzoyl peroxide, t-butylperoxyisobutylate, 1,1-di(t-hexylperoxy)cyclohexane, t-butyl hydroperoxide, and hydrogen peroxide, and redox initiators that combine a peroxide and a reducing agent, such as the combination of a persulfate and sodium hydrogen sulfite and the combination of a peroxide and sodium ascorbate.

The polymerization initiator may be used singly or in mixtures of two or more. Based on 100 parts by weight of the monomer, it is preferred that the total content of the polymerization initiator is about 0.005 to 1 part by weight, and more preferably about 0.02 to 0.5 parts by weight.

In the present invention, a chain transfer agent may be used in the polymerization. By using a chain transfer agent, the molecular weight of the acrylic polymer can be appropriately adjusted.

Examples of the chain transfer agent include lauryl mercaptan, glycidyl mercaptan, mercaptoacetic acid, 2-mercaptoethanol, thioglycolic acid, 2-ethylhexyl thioglycolate, 2,3-dimercapto-1-propanol and the like.

The chain transfer agent may be used singly or in mixtures of two or more. Usually, based on 100 parts by weight of the monomer, the total content of the chain transfer agent is about 0.01 to 0.1 parts by weight.

When emulsification polymerization is carried out, examples of the emulsifier used include anionic emulsifiers such as sodium lauryl sulfate, ammonium lauryl sulfate, sodium dodecylbenzenesulfonate, ammonium polyoxyethylene alkyl ether sulfate, and sodium polyoxyethylene alkyl phenyl ether sulfate, nonionic emulsifiers such as polyoxyethylene alkyl ether, polyoxyethylene alkyl phenyl ether, polyoxyethylene fatty acid esters, and polyoxyethylene-polyoxypropylene block polymers, and the like. These emulsifiers may be used singly or in combinations of two or more.

In addition, specific examples of a reactive emulsifier in which a radical-polymerizable functional group, such as a propenyl group or an allyl ether group, has been introduced include Aqualon HS-10, HS-20, KH-10, BC-05, BC-10, and BC-20 (each manufactured by Dai-Ichi Kogyo Seiyaku Co., Ltd.) and Adeka Reasoap SE10N (manufactured by Adeka Corporation).

A reactive emulsifier is preferred, because it is incorporated into the polymer chain after polymerization, enabling water resistance to be improved. Based on 100 parts by weight of monomer, the amount of emulsifier used is preferably 0.3 to 5 parts by weight, and in view of polymerization stability and mechanical stability, more preferably of 0.5 to 1 part by weight.

In the present invention, to improve adhesive strength and durability, it is preferred to contain a crosslinking agent in the acrylic polymer component. Although examples of crosslinking agents that can be used include conventionally-known crosslinking agents, such as an isocyanate crosslinking agent, an epoxy crosslinking agent, a melamine crosslinking agent, an oxazoline crosslinking agent, a carbodiimide crosslinking agent, an aziridine crosslinking agent, and a metal chelate crosslinking agent, it is especially preferred to contain an isocyanate crosslinking agent.

Examples of the isocyanate crosslinking agent include aromatic isocyanates, such as tolylene diisocyanate and xylene diisocyanate, alicyclic isocyanates, such as isophorone diisocyanate, aliphatic isocyanates, such as hexamethylene diisocyanate, and the like.

More specifically, examples of the isocyanate crosslinking agent include lower aliphatic polyisocyanates, such as butylene diisocyanate and hexamethylene diisocyanate; alicyclic isocyanates, such as cyclopentylene diisocyanate, cyclohexylene diisocyanate, and isophorone diisocyanate; aromatic diisocyanates, such as 2,4-tolylene diisocyanate, 4,4'-diphenylmethane diisocyanate, xylylene diisocyanate, and polymethylene polyphenyl isocyanate; isocyanate adducts such as a trimethylolpropane-tolylene diisocyanate trimer adduct (trade name: "Coronate L", manufactured by Nippon Polyurethane Industry Co., Ltd.), a trimethylolpropane-hexamethylene diisocyanate trimer adduct (trade name: "Coronate HL", manufactured by Nippon Polyurethane Industry Co., Ltd.), and an isocyanurate of hexamethylene diisocyanate (trade name: "Coronate HX", manufactured by Nippon Polyurethane Industry Co., Ltd.); polyether polyisocyanates and polyester polyisocyanates; adducts thereof with various polyols; polyisocyanates polyfunctionalized with an isocyanurate bond, a biuret bond, an allophanate bond, or the like; and the like.

The above-described crosslinking agents may be used singly or in mixtures of two or more. The total content of the crosslinking agent is preferably 0.02 to 5 parts by weight, more preferably 0.04 to 3 parts by weight, and even more preferably 0.05 to 2 parts by weight, based on 100 parts by weight of the base polymer. By using the crosslinking agent in the above-described range, the cohesive force between the polymer chains can be more reliably improved, and the thermally conductive organic resin layer can be given excellent durability. On the other hand, if the content is more than 2 parts by weight, the crosslink formation may become excessive, and the adhesion properties may deteriorate.

In the present invention, it is preferred to adjust the amount of the crosslinking agent added so that the crosslinked thermally conductive organic resin layer has a gel fraction of 40 to 90% by weight, more preferably 50 to 85% by weight, and even more preferably 55 to 80% by weight. If the gel fraction is less than 40% by weight, durability may deteriorate due to a deterioration in the cohesive force. If the gel fraction is more than 90% by weight, the adhesion properties can deteriorate.

The gel fraction (% by weight) of the thermally conductive organic resin layer in the present invention can be determined by collecting a dry weight W1 (g) specimen from the thermally conductive organic resin layer, dipping the specimen in ethyl acetate, then extracting the insoluble fraction of the specimen from the ethyl acetate, measuring the dry weight W2 (g), and calculating (W2/W1)×100.

The thermally conductive filler used in the present invention is not especially limited, and examples include particles of boron nitride, aluminum nitride, silicon nitride, gallium nitride, aluminum hydroxide, magnesium hydroxide, silicon carbide, silicon dioxide, aluminum oxide, titanium oxide, zinc oxide, tin oxide, copper oxide, nickel oxide, antimonic acid-doped tin oxide, calcium carbonate, barium titanate, potassium titanate, copper, silver, gold, nickel, aluminum, platinum, carbon black, carbon tube (carbon nanotube), carbon fiber, diamond and the like. Among these thermally conductive fillers, due to having high thermal conduction properties and electrical insulation properties, it is preferred to use boron nitride, aluminum hydroxide, and aluminum oxide. These thermally conductive fillers may be used singly or in combinations of two or more.

The shape of the thermally conductive filler used in the present invention is not especially limited, and may be a bulk shape, needle shape, fibrous, plate shape, or stratified. Examples of the bulk shape include spherical, rectangular, a crushed shape, or an irregular shape thereof.

Especially, in the thermally conductive member according to the present invention, because thermal conduction properties in the surface direction is demanded, it is preferred to employ plate-shaped, fibrous, or stratified inorganic particles as the thermally conductive filler. Such a thermally conductive filler can be easily oriented in the planar direction of the thermally conductive organic resin layer and can easily form a thermally conductive member that has excellent thermal conduction properties in the surface direction when forming a thermally conductive organic resin layer with a thermally conductive organic resin composition including this thermally conductive filler.

The size of the thermally conductive filler in the present invention is, for a bulk-shaped (spherical) thermally conductive filler, based on primary average particle size, 0.1 to 1,000 μm, preferably 1 to 100 μm, and more preferably 2 to 20 μm. If the primary average particle size is more than 1,000 μm, the thermally conductive filler exceeds the thickness of the thermally conductive resin layer, causing thickness unevenness, which is a problem.

If the thermally conductive filler has a needle shape or a plate shape, the maximum length is 0.1 to 1,000 μm, preferably 1 to 100 μm, and more preferably 2 to 20 μm. If the maximum length is more than 1,000 μm, the thermally conductive fillers tend to agglomerate, making handling more difficult, which is a problem.

The aspect ratio of the thermally conductive filler (expressed as, for needle crystals, long axis length/short axis length, or long axis length/thickness. Further, for plate-shaped crystals, expressed as diagonal length/thickness or long side length/thickness) is 1 to 10,000, and preferably 10 to 1,000.

As such a thermally conductive filler, a common commercially available product can be used. Examples thereof include, as boron nitride, "HP-40" manufactured by Mizushima Ferroalloy Co., Ltd., "PT620" manufactured by Momentive Performance Materials Inc., and the like, as aluminum hydroxide, "Higilite H-32", "Higilite H-42" manufactured by Showa Denko K.K., and the like, as aluminum oxide, "AS-50" manufactured by Showa Denko K.K., and the like, as magnesium hydroxide, "KISUMA 5A" manufactured by Kyowa Chemical Industry Co., Ltd., and the like, as antimonic acid-doped tin, "SN-100S", "SN-100P", "SN-100D (water dispersed product)" manufactured by Ishihara Sangyo Kaisha, Ltd., and the like, as titanium oxide, "TTO series" manufactured by Ishihara Sangyo Kaisha, Ltd., and the like, as zinc oxide, "ZnO-310", "ZnO-350", "ZnO-410" manufactured by Sumitomo Osaka Cement Co., Ltd., and the like.

The amount of thermally conductive filler used in the present invention is, based on 100 parts by weight of polymer component, 10 to 1,000 parts by weight, preferably 50 to 500 parts by weight, and more preferably 100 to 400 parts by weight. If the amount of the thermally conductive filler used is more than 1,000 parts by weight, the flexibility of the thermally conductive organic resin composition deteriorates, reducing the adhesion or peel strength, which is a problem. If the amount is less than 10 parts by weight, this can prevent sufficient thermal conduction properties from being given.

A silane coupling agent can be used in the thermally conductive organic resin composition according to the present invention in order to further improve the adhesive strength, durability, and compatibility of the thermally conductive filler particles and the acrylic polymer. A known silane coupling agent can be used as the silane coupling agent as appropriate without any particular restrictions.

Specific examples include epoxy group-containing silane coupling agents, such as 3-glycidoxypropyltrimethoxysilane, 3-glycidoxypropyltriethoxysilane, 3-glycidoxypropylmethyldiethoxysilane, and 2-(3,4-epoxycyclohexyl)ethyltrimethoxysilane, amino group-containing silane coupling agents, such as 3-aminopropyltrimethoxysilane, N-2-(aminoethyl)-3-aminopropylmethyldimethoxysilane, and 3-triethoxysilyl-N-(1,3-dimethylbutylidene)propylamine, (meth) acrylic group-containing silane coupling agents, such as 3-acryloxypropyltrimethoxysilane and 3-methacryloxypropyltriethoxysilane, isocyanate group-containing silane coupling agents, such as 3-isocyanatepropyl triethoxysilane, and the like. It is preferred to use such a silane coupling agent, in order to improve the durability of the thermally conductive layer formed from this thermally conductive organic resin composition.

The above-described silane coupling agent may be used singly or in mixtures of two or more. Based on 100 parts by weight of the acrylic polymer, the total content of the silane coupling agent is preferably 0.01 to 10 parts by weight, more preferably 0.02 to 5 parts by weight, and even more preferably 0.05 to 2 parts by weight. By using the silane coupling agent within the above range, the thermally conductive organic resin composition can exhibit a high cohesive force and the durability of the thermally conductive layer formed from the thermally conductive organic resin composition can be improved. On the other hand, if this content is less than 0.01 parts by weight, the surface of the thermally conductive filler particles contained in the thermally conductive organic resin composition may not be covered or coated, and compatibility may not improve. On the other hand, if the content is more than 10 parts by weight, thermal conduction properties can deteriorate.

In the present invention, a tackifier resin can be added in order to improve the adhesive strength of the thermally conductive organic resin composition and to improve the durability of the thermally conductive layer formed from the thermally conductive organic resin composition.

A known tackifier resin can be used as the tackifier resin as appropriate without any particular restrictions. Specific examples of the tackifier resin include rosin resins, terpene resins, aliphatic petroleum resins, aromatic petroleum resins, copolymerized petroleum resins, alicyclic petroleum resins, xylene resins, elastomers and the like.

It is preferred that the amount of tackifier resin contained in the thermally conductive organic resin composition is, based on 100 parts by weight of the polymer component, in the ratio of anywhere between 10 and 100 parts by weight, more preferably 20 and 80 parts by weight, and even more preferably 30 and 50 parts by weight.

Although not described in full detail here, in addition to the above-described polymer component, thermally conductive filler and the like, the thermally conductive organic resin composition according to the present embodiment may also appropriately include additives that are commonly used for rubber- or plastic-containing chemicals, such as a dispersing agent, an anti-aging agent, an antioxidant, a processing aid, a stabilizer, a defoaming agent, a flame retardant, a thickening agent, and a pigment, within a range which does not substantially harm the advantageous effects of present invention.

Next, the method for producing the thermally conductive organic resin layer using such a thermally conductive organic resin composition will be described by taking, for example, a coating method in which a liquid-state thermally conductive organic resin composition is used.

First, the thermally conductive filler and the other components are incorporated into the polymer component, and the resultant mixture is stirred to produce a coating liquid (liquid-state thermally conductive organic resin composition) to be used for coating.

As the method for producing the thermally conductive organic resin layer using the thus-produced coating liquid, a conventionally widely-used coating method may be employed. For example, the thermally conductive organic resin layer can be produced by coating the coating liquid on a release film, drying the coating liquid, and then laminating a separate release film.

Examples of the method for forming the thermally conductive organic resin layer in the present invention include roll coating, kiss roll coating, gravure coating, reverse coating, roll brushing, spray coating, dip roll coating, bar coating, knife coating, air knife coating, curtain coating, lip coating, an extrusion coating method that uses a die coater and the like.

Examples of the composition material of the release film may include plastic films such as polyethylene, polypropylene, polyethylene terephthalate, porous materials such as paper, cloth, and nonwoven fabric, suitable thin sheet bodies such as a net, foamed sheet, metal foil, and laminates thereof, and the like. However, from the perspective of surface smoothness, it is preferred to use a plastic film.

This plastic film is not especially limited, as long as it is a film that can protect the thermally conductive organic resin layer. Examples include a polyethylene film, a polypropylene film, a polybutene film, a polybutadiene film, a polymethylpentene film, a polyvinylchloride film, a vinyl chloride copolymer film, a polyethylene terephthalate film, a polybutylene terephthalate film, a polyurethane film, an ethylene-vinyl acetate copolymer film and the like.

The release film may be subjected to a mold release treatment or an antifouling treatment with a silicone, fluorine, long-chain alkyl, or fatty acid amide mold release agent, or with a silica powder, or to a coating type, kneading type, or vapor-deposition type antistatic treatment, as necessary.

Especially, if the surface of the release film is appropriately subjected to a release treatment such as a silicone treatment, a long-chain alkyl treatment, and a fluorine treatment, the release properties from the pressure-sensitive adhesive layer can be further increased. The thickness of the release film is generally 5 to 200 μm, and preferably about 5 to 100 μm.

It is preferred that the thickness of the thermally conductive organic resin layer according to the present invention is 1 μm to 500 μm, more preferably 5 μm to 200 μm, and even more preferably 10 μm to 100 μm.

(Resin Member)

The resin member forming the backing layer in the present invention needs to have a thermal conductivity of less than 0.5 W/mK. By using a resin member having a thermal conductivity of less than 0.5 W/mK, when the thermally conductive member is formed, the interlayer thermal conductivity can be made to be less than 0.5 W/mK, heat conduction to the adjacent battery cell can be prevented, and heat can be efficiently dissipated into the heat dissipation space. If the thermal conductivity is 0.5 W/mK or more, heat is conducted to the adjacent battery cell, and efficient heat dissipation becomes difficult. In the present invention, it is preferred that the thermal conductivity of the resin member is 0.4 W/mK or less, and more preferably 0.3 W/mK or less.

In the present invention, it is preferred that the resin member has a flexural modulus (ASTM D-790) of 1 GPa or more, more preferably 2 GPa or more, and even more preferably 5 GPa or more. If the flexural modulus is 1 GPa or more, the rigidity of the thermally conductive member increases, so that the thermally conductive member can be made to function as a reinforcement plate of the formed battery pack device. Although it is possible to obtain a thermally conductive member having such a flexural modulus by increasing the flexural modulus of the thermally conductive organic resin layer forming the thermally conductive member, since it is generally required to make the resin harder in order to increase the flexural modulus, in many cases it is difficult to obtain both such a flexural modulus and pressure-sensitive adhesion properties. Therefore, in the present invention, it is preferred to use a resin member having a high flexural modulus.

It is preferred that the thermally conductive member according to the present invention has electrical insulation properties. In a lithium-ion battery, since the electromotive force mechanism dislikes moisture, the casing forming the battery is made from a metal. Specifically, based on the battery structure of a lithium-ion battery, the potential of the metal casing is a potential between the positive electrode potential and the negative electrode potential of the lithium-ion battery. Therefore, for a battery pack configured from a plurality of lithium-ion batteries, when the metal casings of the respective lithium-ion batteries directly contact with each other, the potential of the lithium-ion batteries becomes the same, which can prevent a sufficient open-end voltage as a battery pack from being obtained. Consequently, it is necessary to provide sufficient electrical insulation between the battery cells. To give the thermally conductive member electrical insulation properties, it is preferred to use a resin member having high electrical insulation properties to form the backing layer.

It is preferred that the resin member in the present invention has electrical insulation properties of, based on volume resistivity (ASTM D-257), $1\times10^{10}$ Ωcm or more, more preferably $5\times10^{10}$ Ωcm or more, and even more preferably $1\times10^{11}$ Ωcm or more (and usually $1\times10^{20}$ Ωcm or less). If the electrical insulation properties are $1\times10^{10}$ Ωcm or more, a thermally conductive member having sufficient electrical insulation properties can be formed, and when this thermally conductive member is used in a battery pack device, a sufficiently high open-end voltage can be obtained.

In the present invention, it is preferred to use a thermosetting resin as the material forming the resin member. Thermosetting resins have excellent electrical insulation properties, have a three-dimensional crosslinked structure to be strong as a thermally conductive member, and also have excellent heat resistance. Thus, it is preferred to use a thermosetting resin for this application.

Examples of such a resin member may include polyester resins, such as polycarbonate resin, polyethylene terephthalate, polyethylene naphthalate, and polybutylene terephthalate, polyamide resins, such as partial aromatic polyamides, polyimide resins, epoxy resins, phenol resins, melamine resins, urea resins, unsaturated polyester resins, alkyd resins, polyurethane resins, thermosetting polyimide resins and the like. These may be used singly or in combinations of two or more.

In the present invention, although the above-described resin can be used by curing as is, the resin may be impregnated into or coated on some other member. Such a member may be a composite with a fibrous material, such as a glass fiber, a carbon fiber or an aramid, a composite with paper or a nonwoven fabric, a laminate with a plastic base material, such as polyethylene terephthalate, polyethylene naphthalate, and polybutylene terephthalate, a mixture such as an epoxy phenol resin, and the like.

It is preferred to use for the resin member in the present invention a resin member obtained by impregnating an epoxy resin composition including an epoxy resin and a curing agent into glass cloth and then heat-curing the composition, because such a resin member has high dimensional stability, water and chemical resistance, and electrical insulation properties.

Examples of the epoxy resin include, but are not especially limited to, aromatic epoxy resins, aliphatic/alicyclic epoxy resins, nitrogen-containing ring epoxy resins and the like.

The aromatic epoxy resin is an epoxy resin in which the benzene ring is contained in the molecular chain as a structural unit. Examples thereof include, but are not especially limited to, bisphenol type epoxy resins, such as a bisphenol A type epoxy resin, a dimer acid-modified bisphenol A type epoxy resin, a bisphenol F type epoxy resin, and a bisphenol S type epoxy resin, novolac type epoxy resins, such as a phenol novolac type epoxy resin and a cresol novolac type epoxy resin, naphthalene type epoxy resins, biphenyl type epoxy resins, and the like.

Examples of aliphatic/alicyclic epoxy resins include a hydrogenated bisphenol A type epoxy resin, a dicyclo type epoxy resin, an alicyclic epoxy resin and the like.

Examples of nitrogen-containing ring epoxy resins include a triglycidyl isocyanurate epoxy resin, a hydantoin epoxy resin and the like.

These epoxy resins may be used singly or can also be used together. Among these epoxy resins, it is preferred to use an aromatic epoxy resin or an aliphatic/alicyclic epoxy resin. Considering reinforcement properties, it is more preferred to use a bisphenol type epoxy resin or an alicyclic epoxy resin.

Examples of the curing agent include amine compounds, acid anhydride compounds, amide compounds, hydrazide compounds, imidazole compounds, imidazoline compounds and the like. Further examples include phenol compounds, urea compounds, polysulfide compounds and the like.

Examples of the amine compounds include ethylenediamine, propylenediamine, diethylenetriamine, triethylenetetramine, an amine adduct thereof, a meta-phenylenediamine, diaminodiphenylmethane, diaminodiphenyl sulfone and the like.

Examples of the acid anhydride compounds include phthalic anhydride, maleic anhydride, tetrahydrophthalic anhydride, hexahydrophthalic anhydride, methyl nadic anhydride, pyromellitic anhydride, dodecenyl succinic anhydride, dichlorosuccinic anhydride, benzophenone tetracarboxylic anhydride, chlorendic anhydride and the like.

Examples of the amide compounds include dicyandiamide, polyamide and the like.

Examples of the hydrazide compounds include dihydrazides, such as dihydrazide adipate.

Examples of the imidazole compounds include methylimidazole, 2-ethyl-4-methylimidazole, ethylimidazole, isopropylimidazole, 2,4-dimethylimidazole, phenylimidazole, undecylimidazole, heptadecylimidazole, 2-phenyl-4-methylimidazole and the like.

Examples of the imidazoline compounds include methylimidazoline, 2-ethyl-4-methylimidazoline, ethylimidazoline, isopropylimidazoline, 2,4-dimethylimidazoline, phenylimidazoline, undecylimidazoline, heptadecylimidazoline, 2-phenyl-4-methylimidazoline and the like.

These curing agents may be used singly or can also be used together. Among these curing agents, considering adhesion properties, it is preferred to use dicyandiamide.

Although the blending ratio of the curing agent depends on the equivalent ratio of the curing agent and the resin component, based on 100 parts by weight of the resin component, the blending ratio is, for example, 0.5 to 50 parts by weight, preferably 1 to 40 parts by weight, and more preferably 1 to 15 parts by weight.

A curing accelerator can be used together with the curing agent as necessary. Examples of the curing accelerator include imidazoles, ureas, tertiary amines, phosphorus compounds, quaternary ammonium salts, organic metal salts and the like. These may be used singly or can also be used together. The blending ratio of the curing accelerator is, based on 100 parts by weight of the resin component, for example, 0.1 to 20 parts by weight, and preferably 0.2 to 10 parts by weight.

In the present invention, in addition to the above-described epoxy resin, curing agent, and curing accelerator, known additives, such as an organic silane compound, an emulsifier, a defoaming agent, and a pH adjuster, as well as a resin other than an epoxy resin and a solvent, can be blended as appropriate.

To obtain the above-described resin member used in the present invention, first, the epoxy resin composition is impregnated into a glass cloth. This impregnation can be carried out using a known impregnation method, such as dipping, spraying, coating with a kiss roll and the like. Further, after impregnating, it is preferred to wring out the epoxy resin composition using a wringer, a coating knife and the like.

Next, the resin member used in the present invention can be obtained by drying the wrung-out product to obtain a glass cloth coated with an epoxy resin composition. Generally, the drying is carried out by heating at 100 to 250° C. to make the curing reaction proceed while volatilizing the solvent.

The resin member of the present invention has a thickness of, usually, 0.1 to 10 mm, preferably 0.5 to 5 mm, and more preferably about 1 to 3 mm.

(Thermally Conductive Member)

The thermally conductive member according to the present invention will now be described with reference to FIG. 1.

The shape of the thermally conductive member according to the present invention can usually be a sheet shape, for example, a thick sheet (plate shape) or a thin sheet (film-shape).

Further, the planar shape of the thermally conductive member can be rectangular, circular and the like, and can be made to match the shape of the battery cells. Further, the thermally conductive member may also be a sheet with a long thin tape shape.

In addition, the thermally conductive member does not have to be a sheet having a uniform thickness. For example, if the thermally conductive member is to be interposed between battery cells that are round, the thermally conductive member can have a sheet shape that is thinner at the center portion than at both edge portions to match the surface shape of the battery cells.

A rectangular sheet-shaped thermally conductive member will now be described that is utilized in a battery pack device that uses a plurality of flat, square, plate-shaped battery cells.

Figure 1:
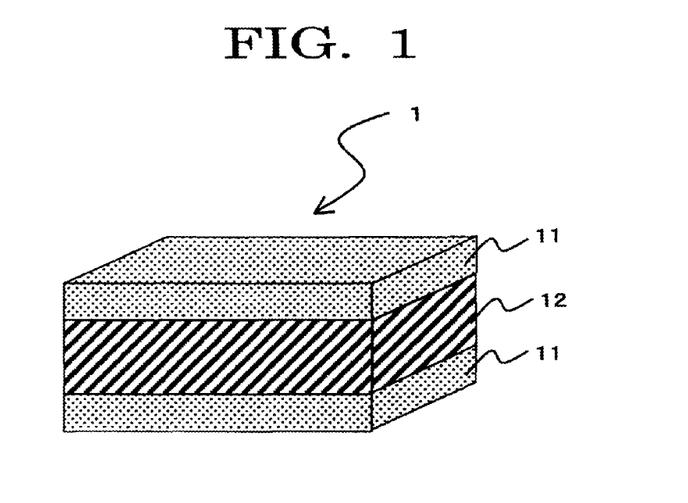
FIG. 1 is a schematic perspective view illustrating an embodiment of a thermally conductive member according to the present invention.

FIG. 1 is a schematic perspective view illustrating an embodiment of the thermally conductive member according to the present invention. In FIG. 1, a thermally conductive member 1 has a configuration in which thermally conductive organic resin layers 11 are provided on both sides of a resin member 12 that forms a backing layer.

The thermally conductive organic resin layers 11 provided on both faces of the resin member 12 may be formed from the same thermally conductive organic resin composition or may be thermally conductive organic resin layers formed from different materials. If different thermally conductive organic resin layers are provided, thermally conductive members having different thermal conduction properties can be provided on both faces of the thermally conductive member 1. Such a configuration has the advantage that the thermal conduction properties can be adjusted when the heat generation temperatures of adjacent battery cells are different.

Although the method for producing the thermally conductive member 1 according to the present invention is not especially limited, for example, the thermally conductive member 1 can be formed by laminating thermally conductive organic resin sheets formed by a coating method that uses the above-described liquid-state thermally conductive organic resin composition on the resin member 12 to form the thermally conductive organic resin layers 11.

Further, in the present invention, the thermally conductive member 1 can also be formed by directly coating the liquid-state thermally conductive organic resin composition onto the resin member 12, and drying the composition to form the thermally conductive organic resin layers 11 on the resin member 12.

It is preferred that the thermally conductive member 1 according to the present invention has a thickness of 0.10 to 11 mm, more preferably 0.51 to 5.4 mm, and even more preferably 1.0 to 3.2 mm.

Further, in the thermally conductive member 1 according to the present invention, it is preferred that the ratio between the thickness of each of the thermally conductive organic resin layers 11 and the thickness of the resin member 12 (thermally conductive organic resin layer/resin member) is 1/1 to 1/10,000, and more preferably 1/10 to 1/1,000.

The thermally conductive member according to the present invention is not limited to a three layer structure like the example described above composed of "thermally conductive layer (thermally conductive organic resin layer)/backing layer (resin member)/thermally conductive layer (thermally conductive organic resin layer)". For example, a structure having four or more layers may be employed, in which one or both of the thermally conductive layers are formed from two or more layers, the backing layer is configured from two or more layers, or a very thin layer formed from a material having a thermal conductivity of less than 0.5 W/mK is formed on the outer side of a thermally conductive layer.

Further, the thermally conductive member according to the present invention is not limited to have a thermally conductive organic resin layer described above as a thermally conductive layer. For example, the thermally conductive layer may be formed from a metal foil, an inorganic fiber sheet and the like.

(Battery Pack Device)

Figure 2:
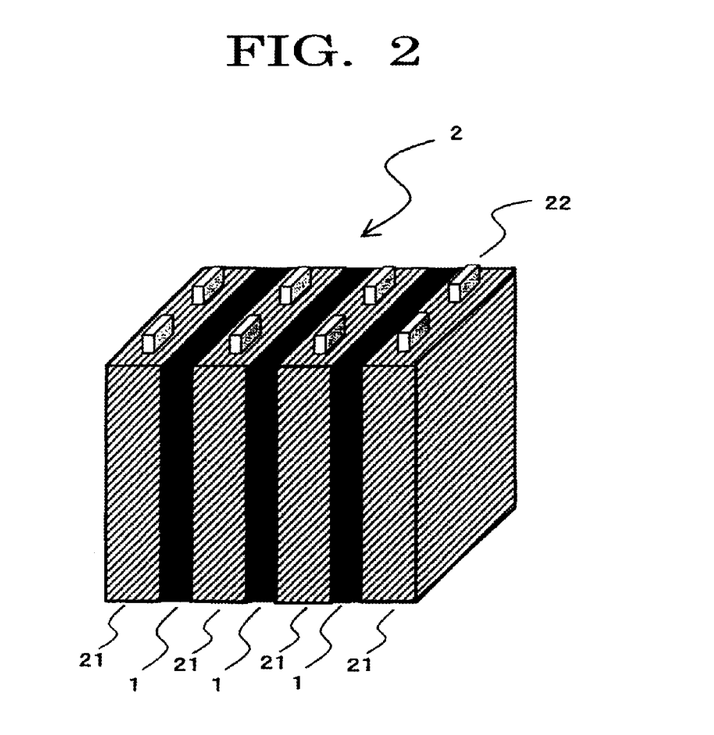
FIG. 2 is a schematic perspective view illustrating an embodiment of a battery pack device according to the present invention.

Next, the battery pack device according to the present invention will be described with reference to FIG. 2. FIG. 2 is a schematic perspective view illustrating an embodiment of the battery pack device according to the present invention. In FIG. 2, a battery pack device 2 comprises a plurality of alternately lined-up battery cells 21 and thermally conductive members 1 which are adhered closely to each other. FIG. 2 illustrates the positional relationship between the battery cells 21 and the thermally conductive members 1, which are important, in the battery pack device according to the present invention. FIG. 2 does not illustrate other parts configuring the battery pack device, such as the casing and the heat sink for heat dissipation.

Further, although the battery pack device 2 configured from four battery cells 21 and three thermally conductive members 1 is illustrated in FIG. 2, the number of lined-up battery cells 21 and thermally conductive members 1 is not limited to this. This number may be adjusted as necessary (usually, several to several dozen battery cells 21 are lined up).

In the present invention, a general so-called prismatic battery cell can be used for the battery cell 21. In this prismatic battery cell, generally, battery elements such as electrode plates, a separator, and an electrolyte are housed in the casing. Although the casing can be made from a resin or from a material whose surface has been coated with an insulating coating, it is preferred to use a battery cell having a casing made from a metal, such as iron or aluminum, that has a high thermal conduction properties.

Typically, a pair of electrodes 22 is formed protruding out from the top of the battery cells 21. Generally, the plurality of battery cells 21 is lined up so that the side having the electrodes 22 is all on the same side.

The broadest side face of the battery cells 21 face the surface of the respective thermally conductive members 1. Therefore, the heat generated by the reaction occurring inside the battery cells 21 passes through the surface layer of the thermally conductive members 1 and is conducted to both end portions. Further, since the thermally conductive member 1 according to the present invention has a low interlayer thermal conductivity of less than 0.5 W/mK, heat tends not to be conducted between the battery cells. Consequently, heat can be efficiently removed from the battery cells 21.

The heat conducted by the thermally conductive members 1 can be dissipated into the atmosphere by the heat dissipation surface of the thermally conductive member 1 that is exposed to the air. Further, a tab that extends from the thermally conductive member 1 may be formed and be made to protrude into the atmosphere.

This other embodiment will be described in more detail with reference to FIG. 3, which illustrates a tab provided on a thermally conductive member in the battery pack device of FIG. 2.

Figure 3:
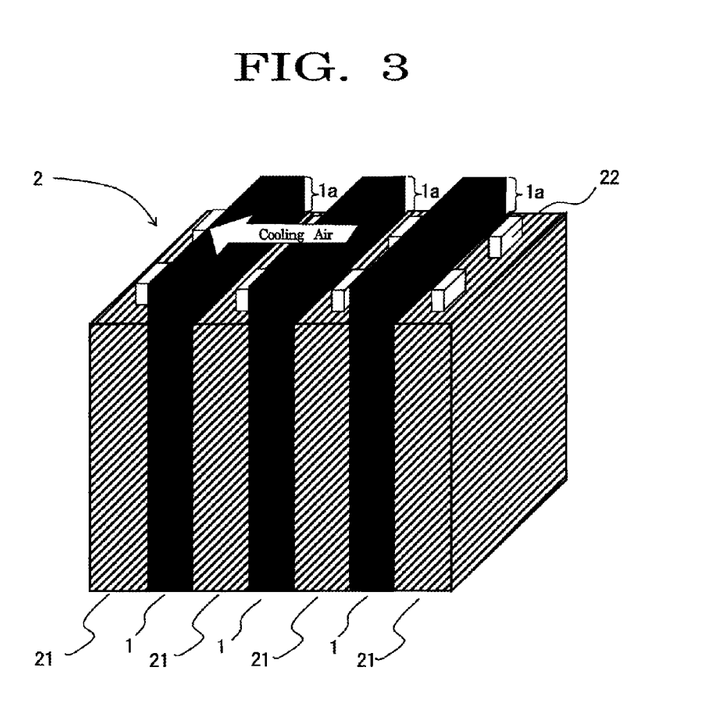
FIG. 3 is a schematic perspective view illustrating another embodiment of the battery pack device according to the present invention.

The battery pack device 2 illustrated in FIG. 3 is similarly configured to the battery pack device illustrated in FIG. 2, except that a tab 1a is formed.

Specifically, the battery pack device illustrated in FIG. 3 includes a plurality of battery cells 21 having a flat, square, plate shape, from which electrodes 22 protrude on one of the four side faces. The plurality of battery cells 21, which have roughly the same shape, are arranged vertically so that the protruding direction of the electrodes 22 is upward.

More specifically, in the battery pack device 2, a plurality of battery cells 21 having a square plate shape are arranged in parallel so that the plate faces thereof face each other and the battery cells 21 sandwich the thermally conductive members 1. The tabs 1a are provided so that the upper end portion of the thermally conductive members 1 extends upward from between the battery cells 21 arranged on both sides thereof.

Concerning the point that, almost the whole surfaces of the regions other than the tab 1a which is exposed to the atmosphere are in facial contact with the battery cells 21 such that the outer peripheries of the regions are aligned with those of the battery cells 21, the example illustrated in FIG. 2 and the example illustrated in FIG. 3 are not different.

Therefore, when the stack of alternately arranged battery cells 21 and thermally conductive members 1 is housed in the casing, if the stack, from which the edge face of the thermally conductive members 1 is exposed, is housed in the casing so that the side face or the bottom face of the stack is in contact with the inner face of the casing, or if the heat sink is made to abut the lower face side of the stack, for example, in the same manner as illustrated in FIG. 2, the heat that passes through the thermally conductive members 1 can be conducted to the casing or the heat sink even if heat is generated in some of the battery cells 21. Further, in the example illustrated in FIG. 3, heat can be dissipated into the atmosphere via the tab 1a.

Heat is dissipated at this stage mainly through the thermally conductive organic resin layer on the side in contact with the battery cell in which the heat has been generated. Further, the conduction of heat to the adjacent battery cells is prevented by the backing layer. Consequently, the risk of other battery cells adjacent to the battery cell in which the heat has been generated being exposed to a high temperature can be suppressed.

To exhibit this effect in a more pronounced manner, it is preferred to increase the surface heat transfer coefficient of the tab 1a by producing an air flow near the surface of the tab 1a.

Specifically, it is preferred to further provide a mechanism such as an air conditioner for air-cooling the extending tab 1a of the thermally conductive member.

Further, to externally dissipate heat efficiently from the thermally conductive layer, it is effective to increase the surface area of the thermally conductive layer at the tab 1a.

Examples of a specific means for thus increasing the surface area of the thermally conductive layer include a method that uses an uneven shape by forming cone-shaped, columnar, plate-shaped or similar protrusions on the surface of the thermally conductive layer, a method that uses a wave shape by forming undulations over the whole of the tab 1a, a method that uses a fibrous thermally conductive layer, and the like.

In addition, it is also effective to increase the thermal emittance of the thermally conductive layer at the tab 1a as a means for externally dissipating heat efficiently.

Specifically, it is preferred to set the thermal emittance of the thermally conductive layer at the tab 1a to 0.1 or more, more preferably to 0.5 or more, and especially preferably to 0.8 or more (and usually, 1.0 or less).

Examples of a method to give such an emittance to the tab 1a include a method of sticking a member having a high thermal emittance, a method of changing the color hue of the tab 1a to black, and a method of suppressing light reflectance by employing a fine uneven structure, a mesh structure, or a fibrous structure on the surface of the tab 1a to eliminate surface gloss.

In the above-described case, a tunnel-shaped air passage formed between the heat dissipation surface or the surface on the side from which the tab protrudes and the inner surface of the casing can be used as a heat dissipation space by housing a pressure-constrained structure in which the battery cells and the thermally conductive members are alternately lined up in the casing. In this case, for example, by making air from an air conditioner flow through the air passage, heat in the respective battery cells can be uniformly dissipated via the heat dissipation surfaces or tabs.

In addition, by arranging a heat sink in which a plurality of heat dissipation plates are lined up in the heat dissipation space and making the heat dissipation surface of the thermally conductive members 1 abut the heat sink, and further configuring so that air from the air conditioner comes into contact with the heat sink, heat in the respective battery cells can be uniformly dissipated via the heat sink and thermally conductive members.

When using a heat sink, it is preferred to arrange the heat sink below the pressure-constrained structure in which the battery cells and the thermally conductive members are alternately lined up. By configuring in this manner, even if for some reason condensation forms in the heat sink, the water droplets can be prevented from coming into contact with the battery cells, thereby reliably preventing shorting.

EXAMPLES

The present invention will now be described in more detail based on the following Examples. However, the present invention is not limited to these Examples.

Example 1

Preparation of Acrylic Polymer Solution

A reaction vessel equipped with a condenser tube, a nitrogen introduction tube, a thermometer, and a stirrer was charged with 70 parts by weight of butyl acrylate, 30 parts by weight of 2-ethylhexyl acrylate, 3 parts by weight of acrylic acid, 0.05 parts by weight of 4-hydroxy butyl acrylate, 0.1 parts by weight of 2,2'-azobisisobutyronitrile (initiator), and 155 parts by weight of toluene (solvent). The system was thoroughly purged with nitrogen gas, and the mixture was then heated for 3 hours at 80° C. to obtain an acrylic polymer solution having a solid content of 40.0% by weight.

Preparation of Thermally Conductive Organic Resin Composition

To 100 parts by weight (solid content) of the above-described acrylic polymer solution, 30 parts by weight of "Pensel D-125" (trade name), which is a rosin resin manufactured by Arakawa Chemical Industries, Ltd., as a tackifier resin, 100 parts by weight of "Higilite H-32" (trade name) (shape: crushed, particle size: 8 μm), which is a thermally conductive aluminum hydroxide powder manufactured by Showa Denko K.K., 1 part by weight of "Plysurf A212E" (trade name) manufactured by Dai-Ichi Kogyo Seiyaku Co., Ltd., as a dispersing agent, and 2 parts by weight of "Coronate L" (trade name), which is a polyfunctional isocyanate compound manufactured by Nippon Polyurethane Industry Co., Ltd., as a crosslinking agent were blended. The resultant mixture was stirred with a dispar for 15 minutes, to thereby prepare a thermally conductive organic resin composition.

Production of Thermally Conductive Organic Resin Layer

A thermally conductive organic resin layer was produced by coating the obtained thermally conductive organic resin composition to a thickness after drying of 50 μm on the release treated face of a release film produced by treating one face of a polyethylene terephthalate with a silicone release agent, and then drying for 15 minutes at 70° C.

Production of Thermally Conductive Member

A thermally conductive member was produced by laminating the above-produced thermally conductive organic resin layers on both faces of a glass epoxy laminate plate having a thickness of 1 mm, a thermal conductivity of 0.3 W/mK, a flexural modulus of 20 GPa, and a volume resistivity of $1 \times 10^{11}$ Ωcm ("SL-EC", manufactured by Nitto Shinko Corporation).

Example 2

A thermally conductive member was produced in the same manner as in Example 1, except that in the preparation of the thermally conductive organic resin composition, 100 parts by weight of boron nitride particles (trade name: "HP-40" manufactured by Mizushima Ferroalloy Co., Ltd.) (shape: bulk mass, particle size: 20 μm) and 2 parts by weight of "Coronate L" (trade name), which is a polyfunctional isocyanate compound manufactured by Nippon Polyurethane Industry Co., Ltd., as a crosslinking agent were added to 100 parts by weight of the above-described acrylic polymer solution, and the resultant mixture was charged into a "Hivis Mix" manufactured by Primix Corporation and stirred under reduced pressure for 30 minutes.

Example 3

A thermally conductive member was produced in the same manner as in Example 1, except that in the preparation of the thermally conductive organic resin composition, 150 parts by weight of boron nitride particles (trade name: "HP-40" manufactured by Mizushima Ferroalloy Co., Ltd.) (shape: bulk mass, particle size: 20 μm) and 2 parts by weight of "Coronate L" (trade name), which is a polyfunctional isocyanate compound manufactured by Nippon Polyurethane Industry Co., Ltd., as a crosslinking agent were added to 100 parts by weight of the above-described acrylic polymer solution, and the resultant mixture was charged into a "Hivis Mixer" manufactured by Primix Corporation and stirred under reduced pressure for 30 minutes.

Comparative Example 1

A thermally conductive member was produced in the same manner as in Example 1, except that instead of a glass epoxy laminate plate, an aluminum plate having a thickness of 1 mm, a thermal conductivity of 237 W/mK, a flexural modulus of 70 GPa, and a volume resistivity of $2.7 \times 10^{-6}$ Ωcm was used.

Comparative Example 2

A thermally conductive member was produced in the same manner as in Example 1, except that in the preparation of the thermally conductive organic resin composition, a pressure-sensitive adhesive composition was used in which 30 parts by weight of "Pensel D-125" (trade name), which is a rosin resin manufactured by Arakawa Chemical Industries, Ltd., as a tackifier resin, and 2 parts by weight of "Coronate L" (trade name), which is a polyfunctional isocyanate compound manufactured by Nippon Polyurethane Industry Co., Ltd., as a crosslinking agent was blended with 100 parts by weight of the above-described acrylic polymer solution.
(Evaluation)

The adhesion or peel strength, thermal conductivity, and thermal conduction properties of Examples and Comparative Examples were measured or evaluated.
(Measurement of Adhesion or Peel Strength)

A 25 μm-thick PET film was laminated on the thermally conductive organic resin layers produced in the respective Examples and Comparative Examples. The resultant laminate was cut to a width of 20 mm and a length of 150 mm to produce evaluation samples. The release film was peeled from the evaluation samples, which were then stacked on an SUS 304 steel plate at 23° C. under a 50% RH atmosphere. A 2 kg roller was passed back and forth once over the evaluation samples stacked on this SUS 304 steel plate to stick the evaluation samples and the US 304 steel plate together. The resultant stack was aged at 23° C. for 30 minutes. Then, using the universal tensile tester "TCM-1kNB" manufactured by Minebea Co., Ltd., a peel test was carried out at a release angle of 180° and a pulling rate of 300 mm/minute, and the adhesive strength was measured.
(Measurement of Thermal Conductivity)

The thermal conductivity of the thermally conductive organic resin layers produced in the respective Examples and Comparative Examples was calculated by determining thermal diffusivity with an "ai-phase mobile" (trade name) manufactured by ai-Phase Co., Ltd., and measuring the heat capacity per unit volume of a thermally conductive pressure-sensitive adhesive sheet using a differential scanning calorimeter (DSC), then multiplying the heat capacity by the above thermal diffusivity.
(Evaluation of Thermal Conduction Properties)

Figure 4:
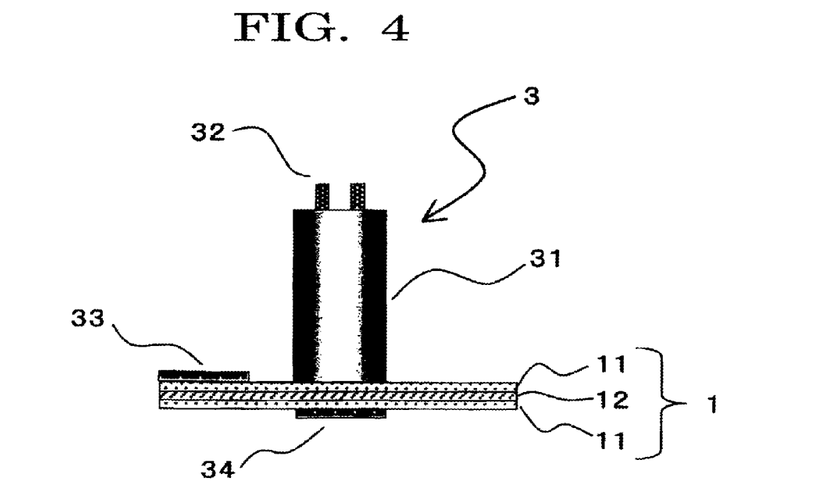
FIG. 4 is a diagram illustrating a method for evaluating the thermal conduction properties of the thermally conductive member according to the present invention.

The thermal conduction properties of the thermally conductive members produced in the respective Examples and Comparative Examples were evaluated by the method illustrated in FIG. 4.

The thermally conductive members 1 produced in the respective Examples and Comparative Examples were cut to a width of 20 mm and a length of 75 mm to produce evaluation samples. The release film was peeled from the evaluation samples. Then, a ceramic heating element 31 (length 8 mm×width 12 mm×height 20 mm) having a rating of 2 W (resistance 100Ω) was stuck onto the center of one face of the evaluation samples, and 35 μm-thick copper foils 33 and 34 were laminated on the rear face and the other edge of the same face. A 1.7 V voltage (17 mA) was applied from an electrode 32 to the ceramic heating element 31. When the ceramic heating element 31 was in a steady state, (after 20 minutes), the temperature of the copper foil 33 on the same face side as the ceramic heating element 31 and the temperature of the copper foil 34 on the rear face side were measured. The temperature of the pre-heating copper foil and ceramic heating element was 25° C., and the temperature of the post-heating heating element was 90° C.

TABLE 1

|  |  | Example 1 | Example 2 | Example 3 | Comparative Example 1 | Comparative Example 2 |
|---|---|---|---|---|---|---|
| Resin Member | Material | Glass Epoxy Laminate Plate | Glass Epoxy Laminate Plate | Glass Epoxy Laminate Plate | Aluminum Plate | Glass Epoxy Laminate Plate |
|  | Thermal Conductivity (W/mk) | 0.3 | 0.3 | 0.3 | 237 | 0.3 |
| Thermally Conductive Organic Resin Layer | Adhesion or Peel Strength (N/20 mm) | 7.8 | 3.5 | 0.6 | 7.8 | 15.2 |
|  | Thermal Conductivity (W/mK) | 0.5 | 3.5 | 5.0 | 0.5 | 0.2 |
| Evaluation of Thermal Conduction Properties (° C.) | Same Face Side | 43 | 47 | 53 | 45 | 30 |
|  | Rear Face Side | 30 | 31 | 29 | 53 | 30 |

It can be seen that a thermally conductive member formed by laminating a thermally conductive organic resin layer having a thermal conductivity of 5 W/mK or more and a resin member having a thermal conductivity of less than 0.5 W/mK, like in the Examples, has good thermal conduction properties to the same face while also having high heat insulating properties to the rear face. In contrast, it can be seen that in Comparative Example 1, which used an aluminum plate having high thermal conduction properties for the resin member, heat was conducted to the rear face. Further, in Comparative Example 2, in which the thermally conductive organic resin layer had a low thermal conductivity, the conduction of heat to the same face was poor.

(Effects of the Tab: Simulation)

A simulation (heat calculation) was performed using software "ANSYS Fluent" from CFD (Computational Fluid Dynamics) based on the finite volume method.

Figure 5:
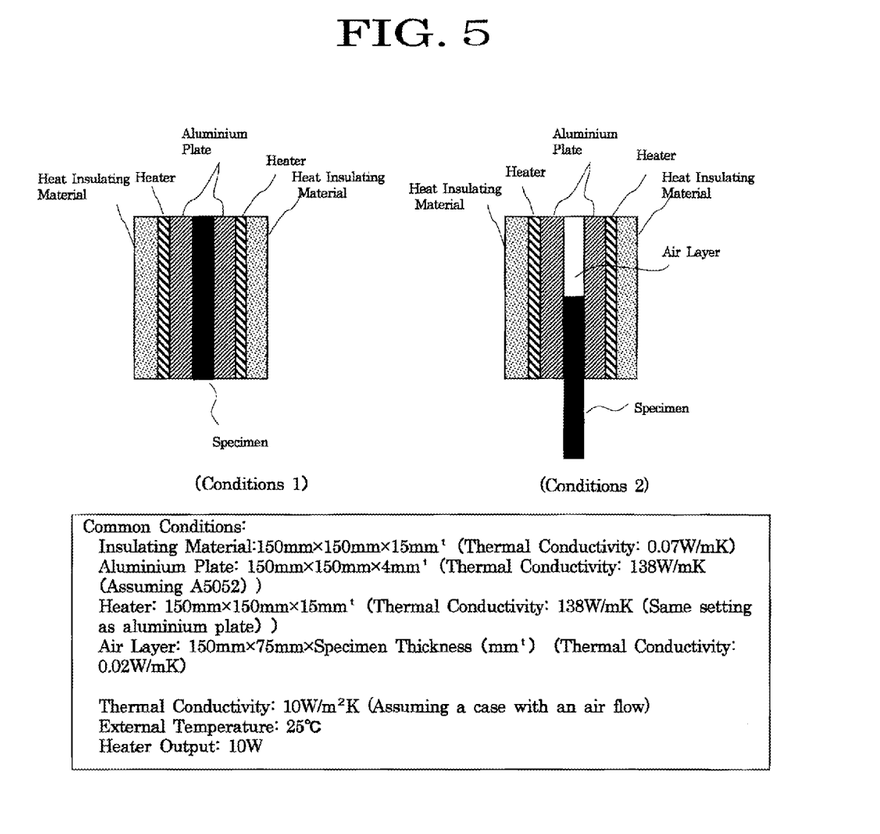
FIG. 5 is a diagram illustrating the conditions for simulation calculation of the thermally conductive member according to the present invention.

The conditions set are shown in FIG. 5.

Specifically, a battery cell was simulated as an assembly of an aluminum plate and a heater arranged on the exterior thereof, and then a thermally conductive member having a three layer structure of a "thermally conductive layer/backing layer/thermally conductive layer" was sandwiched between two battery cells (aluminum plates). A heat insulating material was arranged on the exterior of the heaters to assemble a test piece. Each heater was made to output 10 W (total 20 W), and the volume average temperature of the aluminum plates when this output and the dissipated heat from the test piece was in a state of equilibrium was calculated.

The simulation was carried out on the four specimens (150 mm×150 mm sheets) shown in the following Table 2, for a case in which the specimens were completely sandwiched between aluminum plates ("Condition 1" in FIG. 5) and a case in which a portion corresponding to the tab was formed below the test piece by making the lower half of the specimen stick out from under the aluminum plates ("Condition 2" in FIG. 5).

TABLE 2

|  | Thickness of Each Layer (μm)/ Thermal Conductivity (W/mK) | | |
|---|---|---|---|
|  | Thermally Conductive Layer | Resin Member | Thermally Conductive Layer |
| Specimen 1 | 50/1.6 | 1000/0.2 | 50/1.6 |
| Specimen 2 | 300/16 | 1000/0.2 | 300/16 |
| Specimen 3 | 80/199 | 1000/0.2 | 80/199 |
| Specimen 4 | None | 1000/0.2 | None |

The results of the above simulation are shown in the following Table 3.

TABLE 3

|  | Volume Average Temperature (° C.) of Aluminum Plate | |
|---|---|---|
|  | Condition 1 (no tab) | Condition 2 (with tab) |
| Specimen 1 | 68.95 | 68.01 |
| Specimen 2 | 68.67 | 63.54 |
| Specimen 3 | 68.92 | 60.70 |
| Specimen 4 | 69.32 | 69.26 |

From the above Table 3, it can be seen that Specimens 1 to 3, which correspond to the thermally conductive member according to the present invention, exhibit an excellent cooling effect for a battery cell due to the thermally conductive member being made to extend from the battery cells.

The reason why such results are shown in Table 3 is that the heat from the heaters simulating the heat from the battery cells was able to be more easily externally dissipated due to conduction to the tab.

Further, the greater the thermal conductivity of the thermally conductive layer, the easier it becomes for heat to be conducted to the tab, and the more the volume average temperature of the aluminum plates decreases. Specifically, it can be seen that improving the thermal conductivity of the thermally conductive layer is effective in battery cell heat dissipation.

When a member having an effect of increasing the heat dissipation area, such as a heat sink, is attached to the tab, the amount of dissipated heat increases, so that even better performance than that seen in the left column of the above Table 3 would be expected to be exhibited for Specimens 1 to 3.

REFERENCE SIGNS LIST

1 Thermally Conductive Member
2 Battery Pack Device
3 Thermal Conduction Properties Evaluation Apparatus
11 Thermally Conductive Organic Resin Layer (Thermally Conductive Layer)
12 Resin Member (Backing Layer)
21 Battery Cell
22 Electrode
31 Ceramic Heating Element
33, 34 Copper Foil

| REFERENCE SIGNS LIST | |
|---|---|
| 1 | Thermally Conductive Member |
| 2 | Battery Pack Device |
| 3 | Thermal Conduction Properties Evaluation Apparatus |
| 11 | Thermally Conductive Organic Resin Layer (Thermally Conductive Layer) |
| 12 | Resin Member (Backing Layer) |
| 21 | Battery Cell |
| 22 | Electrode |
| 31 | Ceramic Heating Element |
| 33, 34 | Copper Foil |

The invention claimed is:

1. A thermally conductive member having a sheet shape and arranged between battery cells in a battery pack which has plurality of battery cells, the thermally conductive member comprising
a three-layer laminated structure which is composed of a backing layer, a first thermally conductive layer arranged between a first battery cell and the backing layer, wherein the first battery cell is one of the plural of battery cells, and a second thermally conductive layer arranged between a second battery cell arranged next to the first battery cell and the backing layer,
a first surface which is in contact with the first battery cell, and
a second surface which is in contact with the second battery cell,
wherein the backing layer has a thermal conductivity of less than 0.5 W/mK and each of the first and second thermally conductive layers has a thermal conductivity of 0.5 W/mK or more.

2. The thermally conductive member according to claim 1, wherein the backing layer has a thickness of 0.1 to 10 mm and a ratio of the thickness of the first thermally conductive layer to the thickness of the backing layer is 1/1 to 1/10,000, and a ratio of the thickness of the second thermally conductive layer to the thickness of the backing layer is 1/1 to 1/10,000.

3. The thermally conductive member according to claim 1, wherein the backing layer is made of a resin member having a flexural modulus of 1 GPa or more.

4. The thermally conductive member according to claim 1, wherein each of the first thermally conductive layer and the second thermally conductive layer is provided on a topmost surface and the surface of each of the first thermally conductive layer and the second thermally conductive layer has an adhesion or peel strength of 0.2 N/20 mm or more.

5. The thermally conductive member according to claim 1, wherein each of the first thermally conductive layer and the second thermally conductive layer is made of an acrylic polymer.

* * * * *